T. NAKAMIGAWA.
FLY TRAP.
APPLICATION FILED MAY 21, 1915.
1,173,846. Patented Feb. 29, 1916.
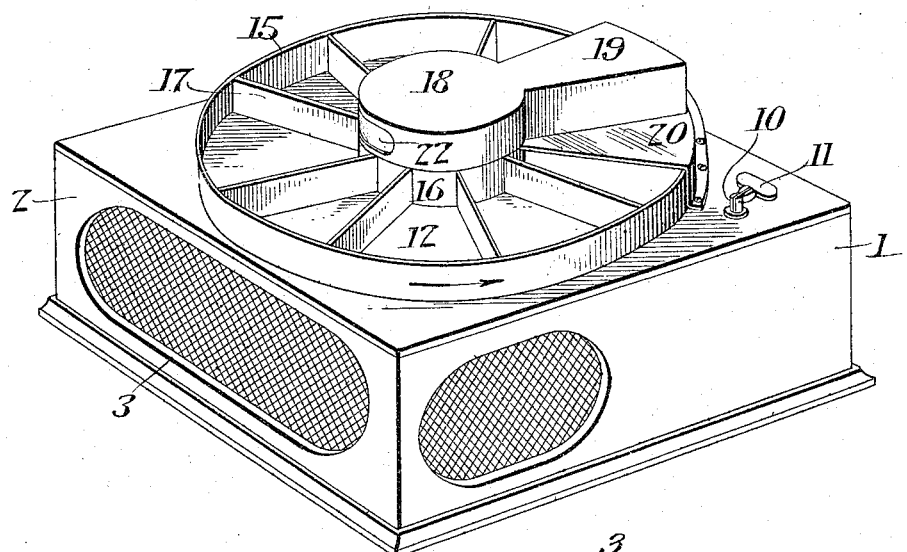
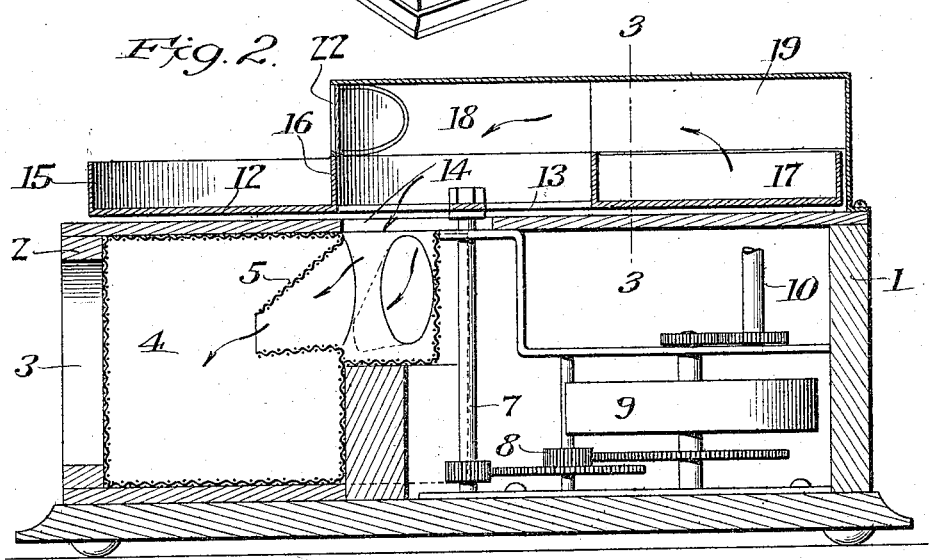
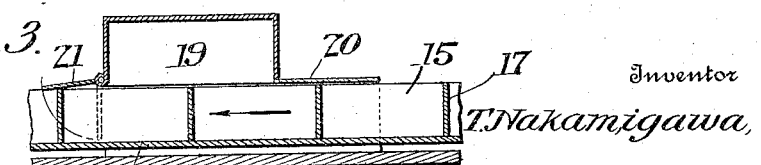
Inventor
T. Nakamigawa,
By Victor J. Evans
Attorney
Witnesses
M. E. Laughlin

UNITED STATES PATENT OFFICE.

TETSUSHIRO NAKAMIGAWA, OF NEW YORK, N. Y.

FLY-TRAP.

1,173,846.

Specification of Letters Patent. Patented Feb. 29, 1916.

Application filed May 21, 1915. Serial No. 29,609.

*To all whom it may concern:*

Be it known that I, TETSUSHIRO NAKAMIGAWA, a subject of the Emperor of Japan, residing at New York city, in the county of New York and State of New York, have invented new and useful Improvements in Fly-Traps, of which the following is a specification.

This invention relates to fly traps and it consists in the novel features hereinafter described and claimed.

An object of the invention is to provide a motor operated trap especially adapted to be used for capturing flies and with this object in view the trap includes a casing having a cage detachably supported thereon. A hood of translucent or opaque material is mounted upon the casing and a member is mounted for movement on the casing and during its movement, part of the member passes under the said hood. The said member is operated by the motor which forms a part of the structure.

The parts of the trap are so arranged that the flies light upon the said movable member and as the same describes its movement, the flies are gently carried under the hood and are subjected to the shadow therefrom. This instinctively excites the suspicion of the insects and they then attempt to make an escape from the trap. In doing so they find that exit from the trap is closed and they are guided by beams of light which are permitted to enter under the hood, and thus in their attempt to make an escape they are directed into the cage, where they are collected in numbers and at desired times the cage may be removed and the insects destroyed.

In the accompanying drawings: Figure 1 is a perspective view of one form of the trap. Fig. 2 is a vertical sectional view of the same. Fig. 3 is a detail sectional view of parts of the same cut on the line 3—3 of Fig. 2.

In the form of the invention shown in Figs. 1, 2 and 3 the trap comprises a casing 1 having at its side a movable panel 2 provided with an opening 3. A cage 4 is detachably mounted in the casing 1 adjacent the panel 2 and the opening 3 thereof. The said cage is provided at that side which is opposite the side thereof adjacent the opening 3 with approximately cone-shaped runways 5.

A shaft 7 is journaled for rotation in a vertical position in the casing 1 and a chain of gear wheels 8 operatively connects the said shaft 7 with a spring motor 9 also located in the casing and which may be of any conventional pattern. A shaft 10 is provided for winding the motor 9 and the upper end of the said shaft extends through the top of the casing 1 and is provided with a pivoted handle 11 which may be used for turning the shaft.

A circular disk 12 is carried at the upper end of the shaft 7 and is located above the top of the casing 1. The disk 12 is provided at its central portion with openings 13. The top of the casing 1 is also provided with an opening 14 with which the openings 13 are successively brought into register as the disk 12 rotates. The disk 12 is provided at its upper side with concentrically positioned spaced flanges 15 and 16 the flange 16 being located within the flange 15 and surrounding the openings 13 at the central portion of the disk 12. Radially disposed partition strips 17 are mounted upon the upper side of the disk 12 and extend from the flange 15 to the flange 16 and divide the space at the upper side of the disk 12 into compartments.

A hood 18 of translucent or opaque material, as for instance celluloid, is positioned above the disk 12 and beyond the upper edge of the flange 16 thereof and is disposed over the openings 13 at the central portion of the said disk. The said hood 18 is provided with a laterally disposed extension 19 which is disposed above the path of movement of the partitions 17 and the compartments therebetween. The extension 19 is provided at one edge with a laterally disposed horizontally positioned flange 20 under which the partitions 17 move successively during the rotation of the disk 12 in the direction indicated by the arrow in Fig. 3 of the drawing. At its opposite side edge the extension 19 is provided with a hinged panel 21 which is adapted to be encountered by the upper edges of the partitions 17 as the said partitions move successively under the same, and the said panel is adapted to serve as a barrier for preventing the flies from following the disk 12 and escaping from under the hood 19 after they have once been carried under the same. When the edge of a partition 17 passes beyond the free edge portion of the panel 20, the said panel swings from the position shown in heavy lines in Fig. 3 to the position shown in dotted lines therein, and thus the said panel prevents the insects from following the disk 12. The hood 18 is provided at its side opposite that side from which the extension 19 is disposed, with a transparency 22 which may be of glass or any other transparent material.

In this form of the invention the operation is as follows: Assuming that the motor 9 is in operation and through the chain of gear wheels 8 the shaft 7 and disk 12 are rotating the flies light upon the upper surface of the disk in the compartments between the partitions 17. As the disk turns in the direction indicated by the arrow in Fig. 3, the flies and the partitions 17 are successively carried under the flange 20. When the flies pass under the said flange, a slight shadow is cast upon them by reason of the fact that the flange is of opaque or translucent material, and this excites the suspicion of the insects and when they arrive under the extensions 19 they fly in an upward direction. Inasmuch as they cannot follow the disk 12 or move in a direction opposite to that in which the disk is moving, they ascend up in the extension 19 and pass into the hood 18 toward the light which is admitted through the transparency 22. When the flies arrive over the openings 13 and above the opening 14 they observe the rays of light which are entering the cage 4 through the opening 3 in the panel 2 of the casing 1. Consequently they descend into the casing 1 through the openings 13 and 14 and pass along the runways 5 into the cage 4. When they arrive in the cage 4 they are trapped and are collected therein until the cage is removed and they are destroyed.

Having described the invention, what is claimed is:—

A fly trap comprising a casing, a cage mounted in the casing, a disk mounted for rotation above the casing and provided with spaced flanges and having radially disposed partitions located between the flanges, the casing being provided under the disk with an opening, said disk having at its central portion an opening which registers with the opening in the casing, a hood fixed above the opening at the central portion of the disk and having a transparency, an extension provided at one side of the hood, an inflexible barrier hingedly connected at one edge to the edge of the extension and adapted to be encountered by the upper edges of the partitions successively as the disk moves under the extension, the axis upon which the barrier swings lying at a right angle to the axis upon which the disk rotates.

In testimony whereof I affix my signature in presence of two witnesses.

TETSUSHIRO NAKAMIGAWA.

Witnesses:
 M. E. LAUGHLIN,
 GEO. A. BYRNE.

Copies of this patent may be obtained for five cents each, by addressing the "Commissioner of Patents, Washington, D. C."